United States Patent
Kim et al.

(10) Patent No.: US 9,713,183 B2
(45) Date of Patent: Jul. 18, 2017

(54) METHOD AND APPARATUS FOR PERFORMING INITIAL ENTRY FOR DEVICE-TO-DEVICE COMMUNICATION IN A WIRELESS COMMUNICATION SYSTEM

(71) Applicant: Samsung Electronics Co., Ltd, Gyeonggi-do (KR)

(72) Inventors: Kyung-Kyu Kim, Gyeonggi-do (KR); Dae-Gyun Kim, Gyeonggi-do (KR); Hyun-Seok Ryu, Yongin-si (KR); Young-Joong Mok, Gyeonggi-do (KR); Seung-Hoon Park, Seoul (KR); Sang-Kyu Baek, Suwon-si (KR); Chi-Woo Lim, Gyeonggi-do (KR); Young-Bin Chang, Gyeonggi-do (KR)

(73) Assignee: Samsung Electronics Co., Ltd, Suwon-si Gyeonggi-do (KR)

( * ) Notice: Subject to any disclaimer, the term of this patent is extended or adjusted under 35 U.S.C. 154(b) by 424 days.

(21) Appl. No.: 14/180,283

(22) Filed: Feb. 13, 2014

(65) Prior Publication Data

US 2014/0227997 A1 Aug. 14, 2014

(30) Foreign Application Priority Data

Feb. 13, 2013 (KR) .................. 10-2013-0015466

(51) Int. Cl.
| | | |
|---|---|---|
| H04M 1/66 | (2006.01) | |
| H04M 1/68 | (2006.01) | |
| H04W 4/00 | (2009.01) | |
| H04W 76/02 | (2009.01) | |
| H04W 12/04 | (2009.01) | |

(52) U.S. Cl.
CPC ......... *H04W 76/023* (2013.01); *H04W 12/04* (2013.01)

(58) Field of Classification Search
None
See application file for complete search history.

(56) References Cited

U.S. PATENT DOCUMENTS

| | | | |
|---|---|---|---|
| 2010/0009675 A1* | 1/2010 | Wijting | H04W 72/02 455/426.1 |
| 2011/0098043 A1 | 4/2011 | Yu et al. | |

(Continued)

FOREIGN PATENT DOCUMENTS

| | | |
|---|---|---|
| WO | WO 2006/016329 A1 | 2/2006 |
| WO | WO 2010/078273 A2 | 7/2010 |
| WO | WO 2012/097075 A2 | 7/2012 |

OTHER PUBLICATIONS

International Search Report dated Apr. 29, 2014 in connection with International Patent Application No. PCT/KR2014/001157, 3 pages.

(Continued)

*Primary Examiner* — Moustapha Diaby (57) ABSTRACT

A method and apparatus for performing initial entry for Device-to-Device (D2D) communication in a wireless communication system include transmitting an initial entry request including a service request for D2D communication to a Mobility Management Entity (MME) by a terminal, and if the service request for D2D communication is accepted, receiving information indicating that the initial entry request is accepted, including D2D communication information from the MME by the terminal.

16 Claims, 7 Drawing Sheets

(56) References Cited

U.S. PATENT DOCUMENTS

| | | | | |
|---|---|---|---|---|
| 2011/0136473 A1* | 6/2011 | Gupta | ............... | H04W 12/08 |
| | | | | 455/411 |
| 2011/0317597 A1* | 12/2011 | Wan | ............... | H04W 72/1289 |
| | | | | 370/281 |
| 2012/0026864 A1* | 2/2012 | Jactat | ............... | H04L 47/70 |
| | | | | 370/216 |
| 2012/0179789 A1* | 7/2012 | Griot | ............... | H04W 12/08 |
| | | | | 709/220 |
| 2012/0196599 A1* | 8/2012 | Cho | ............... | H04W 8/04 |
| | | | | 455/435.1 |
| 2013/0013926 A1* | 1/2013 | Hakola | ............... | H04W 12/04 |
| | | | | 713/171 |
| 2013/0244661 A1* | 9/2013 | Lin | ............... | H04W 76/023 |
| | | | | 455/436 |
| 2013/0259015 A1* | 10/2013 | Fujii | ............... | H04W 84/18 |
| | | | | 370/338 |
| 2013/0297810 A1* | 11/2013 | Ho | ............... | H04W 76/028 |
| | | | | 709/228 |
| 2014/0057670 A1* | 2/2014 | Lim | ............... | H04W 8/005 |
| | | | | 455/509 |
| 2014/0106707 A1* | 4/2014 | Bontu | ............... | H04W 76/023 |
| | | | | 455/410 |

OTHER PUBLICATIONS

Written Opinion of International Searching Authority dated Apr. 29, 2014 in connection with International Patent Application No. PCT/KR2014/001157, 5 pages.

Raghothaman, et al.; "Architecture and Protocols for LTE-based Device to Device Communication"; 2013 Inter'l Conference on Computing, Networking and Communications, Wireless Networks Symposium; pp. 895-899.

* cited by examiner

METHOD AND APPARATUS FOR PERFORMING INITIAL ENTRY FOR DEVICE-TO-DEVICE COMMUNICATION IN A WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Feb. 13, 2013 and assigned Serial No. 10-2013-0015466, the entire disclosure of which is incorporated herein by reference.

TECHNICAL FIELD

The present disclosure relates to a method for performing initial entry for Device-to-Device (D2D) communication in a wireless communication system.

BACKGROUND

No initial entry procedure has been specified for D2D communication in a general wireless communication system. To conduct D2D communication, a User Equipment (UE) should perform a general initial entry procedure in the wireless communication system, which is rather inconvenient. Accordingly, there is a need for an initial entry method for D2D communication in a wireless communication system.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for performing initial entry for Device-to-Device (D2D) communication in a wireless communication system.

In accordance with an aspect of the present disclosure, there is provided a method for performing initial entry for D2D communication in a wireless communication system. The method includes transmitting an initial entry request including a service request for D2D communication to a Mobility Management Entity (MME) by a terminal, and if the service request for D2D communication is accepted, receiving information indicating that the initial entry request is accepted, including D2D communication information from the MME by the terminal.

In accordance with another aspect of the present disclosure, there is provided a method for performing initial entry for D2D communication in a wireless communication system. The method includes receiving an initial entry request including a service request for D2D communication from a terminal, determining whether to accept the service request for D2D communication based on subscriber information about the terminal acquired by a location update procedure for the terminal, and if the service request for D2D communication is accepted, transmitting information indicating acceptance of the initial entry request, including D2D communication information to a base station and the terminal.

In accordance with another aspect of the present disclosure, there is provided a terminal for performing initial entry for D2D communication in a wireless communication system. The terminal includes a controller configured to control a transceiver to transmit an initial entry request including a service request for D2D communication to an MME, and the transceiver configured, if the service request for D2D communication is accepted, to receive information indicating that the initial entry request is accepted, including D2D communication information from the MME.

In accordance with another aspect of the present disclosure, there is provided an apparatus for performing initial entry for D2D communication in a wireless communication system. The apparatus includes a transceiver configured to receive an initial entry request including a service request for D2D communication from a terminal, and a controller configured to determine whether to accept the service request for D2D communication based on subscriber information about the terminal acquired by a location update procedure for the terminal, and if the service request for D2D communication is accepted, to control the transceiver to transmit information indicating acceptance of the initial entry request, including D2D communication information to a base station and the terminal.

Other aspects, advantages, and salient features of the disclosure will become apparent to those skilled in the art from the following detailed description, which, taken in conjunction with the annexed drawings, discloses example embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1A through 6B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and methods. The following description with reference to the accompanying drawings is provided to assist in a comprehensive understanding of example embodiments of the disclosure as defined by the claims and their equivalents. It includes various specific details to assist in that understanding but these are to be regarded as merely an example. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of example embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1A:
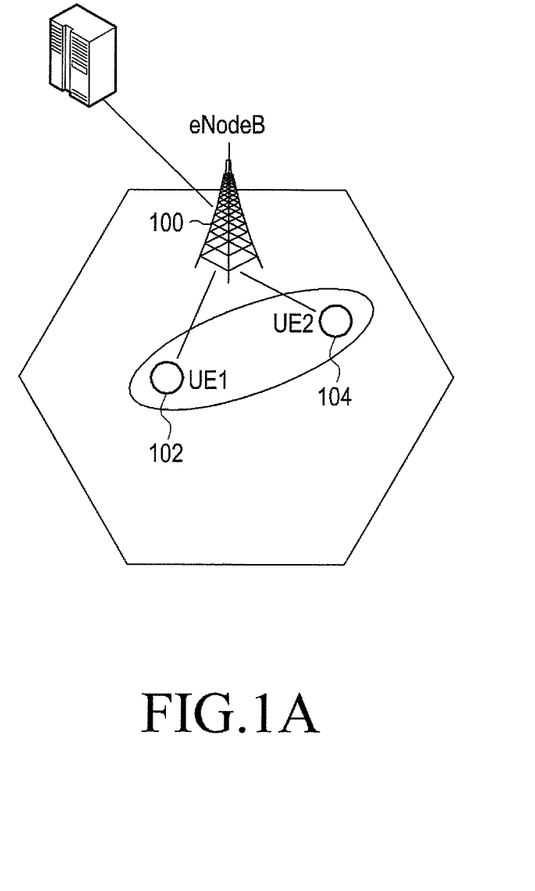
FIG. 1A illustrates a configuration of a general broadband wireless access system.

FIG. 1A illustrates a configuration of a general wireless communication system. The wireless communication system is, for example, a Long Term Evolution (LTE) system herein.

Referring to FIG. 1A, the general LTE system includes, for example, a first User Equipment (UE) ((UE1)) 102, a second UE (UE) 104, an evolved Node B (eNode B or eNB) 100 that determines whether to accept a request for a call of a service received from a UE and dynamically allocates radio resources to the UE, and a Mobility Management Entity/Serving GateWay (MME/S-GW) 106. It is assumed that UE1 102 supports Device-to-Device (D2D) communication and performs initial entry to the LIE system, for D2D communication.

Figure 1B:
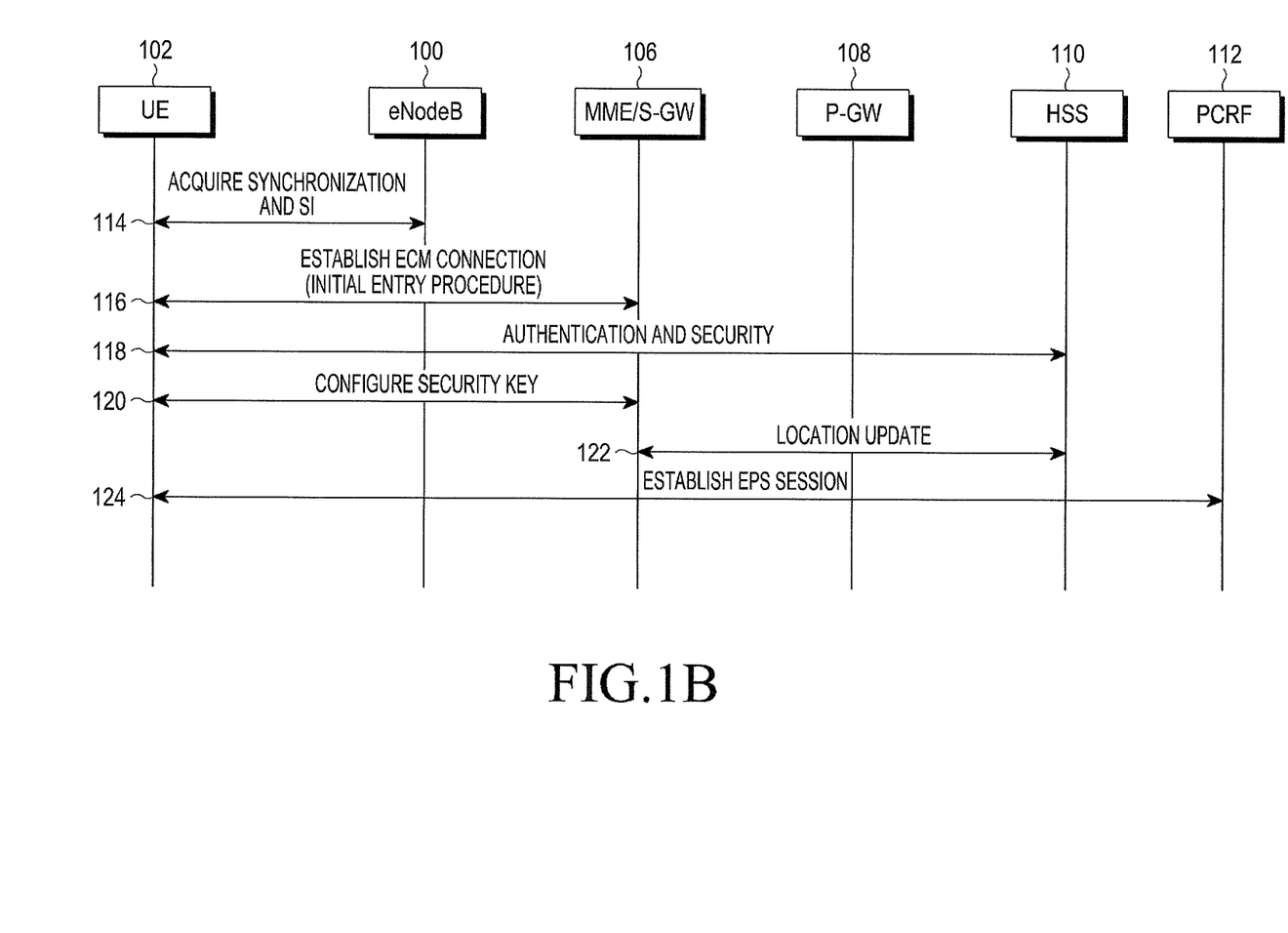
FIG. 1B illustrates a diagram of a signal flow for an initial entry procedure of a User Equipment (UE) illustrated in FIG. 1A in a general Long Term Evolution (LTE) system.

FIG. 1B illustrates a diagram of a signal flow for an initial entry procedure of a UE illustrated in FIG. 1A in the general LTE system.

Referring to FIG. 1B, UE1 102 acquires synchronization to the eNode B 100 in operation 114. In an embodiment, UE1 102 receives a preamble from the eNode B 100 and synchronizes its timing to the eNode B 100 using the preamble. Then the UE 100 gets knowledge of an overall situation of the LIE system including the eNode B 100 by receiving System Information (SI) periodically from the eNode B 100.

In operation 116, UE1 102 transmits an access request to the eNode B 100 by random access and is allocated a unique cell Identifier (ID), Cell Radio Network temporary Identifier (C-RNTI) from the eNode B 100, thereby setting up an Evolved Packet System (EPS) Connection Management (ECM) connection for initial entry to the LIE system. The ECM connection setup includes an initial entry procedure of establishing a Radio Resource Control (RRC) connection and a Non-Access Stratum (NAS) signaling connection with the MME/S-GW 106 and transmitting an Attach Request message of UE1 102 to the MME/S-GW 106 through the eNode B 100.

Upon receipt of the Attach Request message from UE1 102, the MME/S-GW 106 checks subscriber information about UE1 102 through a Home Subscriber Server (HSS) 110 and authenticates UE1 102 for security in the LTE system in operation 118. In operation 120, the MME/S-GW 106 establishes network security by creating an authorization key based on the subscriber information such that UE1 102 may use the authorization key in the LIE system. The MME/S-GW 106 registers UE1 102 to the HSS 110 and performs location update to acquire user profile information about UE1 102 in operation 122.

In operation 124, UE1 102 establishes an EPS session through a security-established network path. That is, UE1 102 is allocated an Internet Protocol (IP) address, establishes a default bearer through a selected Packet Data Network GateWay (PDN/S-GW) 108, and is allocated network resources of the LIE, system through the P-GW 108 in the above operation. While not shown, UE1 102 notifies the eNode B 100 of completion of initial entry to the LTE system by transmitting an Attach Complete message to the eNode B 100.

Upon completion of the initial entry, UE1 102 may transmit a request for resources in which to transmit data to the eNode B 100 and the eNode B 100 may schedule downlink data for UE1 102. However, even for D2D communication, UE1 102 could perform this general initial entry procedure.

Accordingly, the present disclosure provides an initial entry method for D2D communication in a wireless communication system. While the following description is given in the context of an LTE system as an example of the wireless communication system, it is to be clearly understood that the present disclosure is applicable to all systems having a terminal serving as a receiver. Now a description will be given of an initial entry method for D2D communication, with a minimal modification to a system device according to the present disclosure.

In an embodiment, a UE supporting D2D communication performs an initial entry procedure for D2D communication by transmitting and receiving information requesting initial entry for D2D communication in existing messages used for the general initial entry procedure in an embodiment of the present disclosure. The messages will be described in detail with reference to FIG. 2.

In another embodiment of the present disclosure, a D2D controller is added as a unit for performing an initial entry procedure for D2D communication in an existing wireless communication system. The D2D controller may be incorporated into an MME of the legacy LTE system or may be configured independently. If the D2D controller is configured independently, an interface for interfacing between the D2D controller and each existing component is configured separately. An operation of the D2D controller and interfaces will be described in detail with reference to FIGS. 3 and 4.

Figure 2:
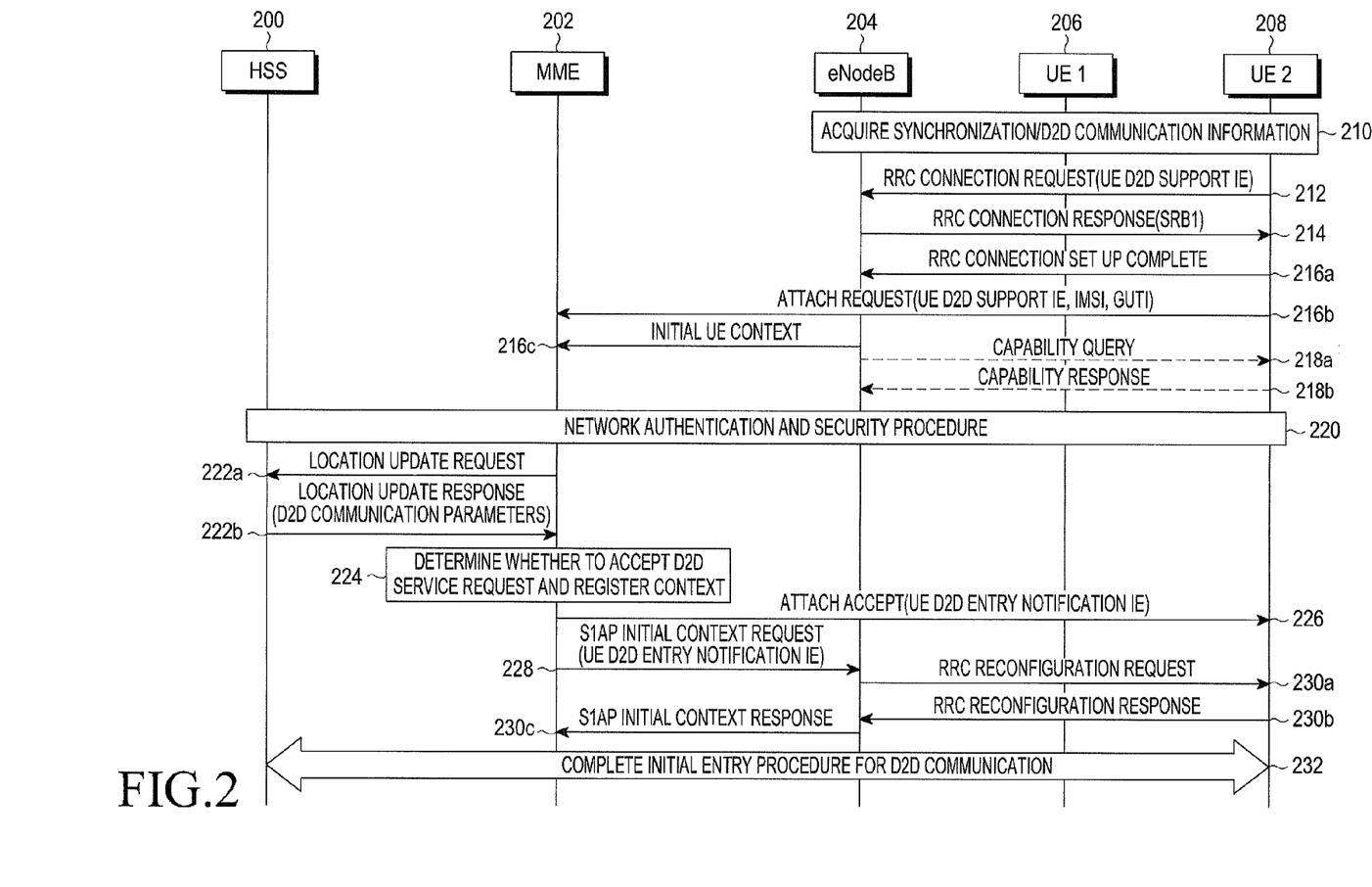
FIG. 2 illustrates a diagram of a signal flow for an initial entry procedure for Device-to-Device (D2D) communication according to an embodiment of the present disclosure.

FIG. 2 illustrates a diagram of a signal flow for an initial entry procedure for D2D communication according to an embodiment of the present disclosure. It is assumed in the illustrated case of FIG. 2 that UE2 208 supports D2D communication and requests a D2D communication service.

Referring to FIG. 2, when UE2 208 is powered on, UE2 208 acquires synchronization to an eNode B 204 that covers UE2 208 by receiving a preamble from the eNode B 204 in operation 210. UE2 208 acquires D2D communication information of the LTE system to which the eNode B 204 belongs by receiving SI from the eNode B 204. The D2D communication information includes information indicating whether the LIE system supports D2D communication and information about the position of resources for D2D communication. The D2D communication information may vary according to the type of a system.

In operation 212, UE2 208 transmits an RRC Connection Request message to the eNode B 204 to initially access the LIE system, for D2D communication. The RRC Connection Request message is identical to an RRC Connection Request message used in the general LTE system except that a 'Cause' Information Element (IE) included in the RRC Connection Request message is set to Mobile Originating Call. Then the eNode B 204 allocates a first Signaling Radio Bearer (SRB 1) to UE2 208 and transmits an RRC Connection Response message including information about SRB 1 to UE2 208 in operation 214. Upon receipt of the RRC Connection Response message, UE2 208 transmits an RRC Connection set up Complete message indicating successful RRC connection setup to the eNode B 204 in operation 216a. UE2 208 may insert, for example, a UE D2D Support IE defined as illustrated in (Table 1) as payload in the RRC Connection set up Complete message. The UE D2D Support IE indicates whether UE2 208 supports D2D communication or whether UE2 208 requests a D2D communication service to the LIE system.

Simultaneously, UE2 208 performs an initial entry procedure to the network, for D2D communication by transmitting an Attach Request message to an MME 202 through a NAS layer in operation 216b. The UE D2D Support IE may also be inserted in the Attach Request message.

TABLE 1

| Information | Presence | Length | Description |
| --- | --- | --- | --- |
| UE D2D Support | 0 | 1 | 0: No D2D support<br>1: D2D support |

The eNode B 204 of the LTE system may not interpret the Attach Request message which is one of NAS messages transmitted and received between the NAS layers of UE2 208 and the MME 202. Accordingly, the eNode B 204 initially establishes an S1 bearer that uses an S1 interface to transmit a NAS message to the MME 202 in the embodiment of the present disclosure. Then the eNode B 204 transmits an Initial UE Context to the MME 202 via the S1 bearer in operation 216c. The Initial UE Context includes an E-UTRAN Cell Global Identifier (ECGI) and a Tracking Area Identity (TAT). The MME 202 recognizes the D2D service request of UE2 208 by interpreting the message received via the S1 bearer and the UE D2D Support IE included in the Attach Request message received through the NAS layer.

In operation 218a, the eNode B 204 transmits a capability inquiry to UEs within the service coverage of the eNode B 204, for example, UE2 208 to check capabilities of UE 208. UE2 208 transmits information about its capabilities in response to the capability inquiry to the eNode B 204 in operation 218b. If UE2 208 has not transmitted the UE D2D Support IE as defined in (Table 1) in the RRC Connection set up Complete message, UE2 208 may transmit the UE D2D Support IE to the eNode B 204 in the capability information. In operation 220, the MME 202 initially performs a network authentication/security operation in response to the D2D service request of UE2 208. During the network authentication/security operation, the LIE system of the eNode B 204 and UE2 208 perform mutual authentication and thus UE2 208 generates a root key according to a network authentication and security procedure defined in the general LTE system. Once network integrity is established by the network authentication/security operation, the MME 202 requests subscriber information about UE2 208 to an HSS 200 by transmitting a Location Update Request message in operation 222a. The HSS 200 transmits a Location Update Response message in response to the Location Update Request message to the MME 202 in operation 222b. Because UE2 208 supports D2D communication, the Location Update Response message includes D2D communication parameters proposed according to an embodiment of the present disclosure as well as the subscriber information about UE2 208. The D2D communication parameters include a D2D Subscribed Access Point Name (APN), a D2D Subscribed P-GW ID, and a D2D Subscribed User Priority Level. The D2D communication parameters may further include other information or may be modified according to the characteristics of the system. The D2D Subscribed APN identifies a service provider to which a D2D user, that is, UE2 208 has subscribed and the D2D Subscribed P-GW ID identifies a P-GW connected to the D2D user. The D2D Subscribed User Priority Level indicates a user class based on user profile information. The service provider provides differentiated services, for example, differentiated resource allocations, transmission priorities, and the like to D2D users. The range of the differentiated services varies with the intent of the service provider.

In operation 224, the MME 202 determines whether to accept the D2D service request of UE2 208 based on the D2D communication parameters. In an embodiment, the MME 202 determines whether a target UE requested for D2D communication exists near to UE2 208 based on the D2D communication parameters. It is assumed herein that the target UE, for example, UE1 206 exists. In the presence of at least one target UE for D2D communication, the MME 202 determines to accept the D2D service request of UE2

208, whereas in the absence of any target UE for D2D communication, the MME 202 determines to reject the D2D service request of UE2 208. If the MME 202 determines to accept the D2D service request of UE2 208, the MME 202 stores the D2D communication parameters as a context of UE2 208. The MME 202 transmits a NAS message, Attach Accept to UE2 208 in operation 226 and transmits an S1AP Initial Context Request message to the eNode B 204 to thereby notify the eNode B 204 of completion of network registration of UE2 208 for D2D communication in operation 228. Since the Attach Accept message is a NAS message, the eNode B 204 may not interpret the Attach Accept message. Therefore, a UE D2D Entry Notification IE illustrated in (Table 2) below is inserted in the S1AP Initial Context Request message in order to indicate completion of the initial entry procedure with the network to the eNode B 204, as is indicated by the Attach Accept message. The UE D2D Entry Notification IE includes a UE D2D Entry Access IE indicating completion of the initial entry procedure of UE2 208 with the network, for D2D communication.

TABLE 2

| Information | Presence | Length | Description |
| --- | --- | --- | --- |
| UE D2D Entry Accept | O | 1 | 0: Reject<br>1: Accept |

The Attach Accept message includes a UE D2D Accept IE and a UE D2D Key Allocation IE as defined in (Table 3). The UE D2D Accept IE indicates whether a D2D service request is accepted or rejected and the UE D2D Key Allocation IE provides an encryption key that UE2 208 is to use during D2D communication. How the encryption key is generated is beyond the scope of the present disclosure and thus will not be described herein in detail.

TABLE 3

| Information | Presence | Length | Description |
| --- | --- | --- | --- |
| UE D2D Accept | o | 1 | 0: Accept<br>1: Reject |
| UE D2D Key allocation | o | X byte | D2D |

In operation 230a, the eNode B 204 transmits an RRC Reconfiguration Request message requesting setup of a default bearer for D2D communication to UE2 208. In the embodiment of the present disclosure, a bearer for D2D communication is not set up. However, if the bearer for D2D communication is to be set up, setup of a bearer for D2D communication may be requested to UE2 208 by the RRC Reconfiguration Request message in another embodiment of the present disclosure.

In operation 230b, UE2 208 establishes the default bearer and transmits an RRC Reconfiguration Response message to the eNode B 204. The eNode B 204 transmits an S1AP Initial Context Response message indicating setup of the default bearer to the MME 202 in operation 230c.

Once the default bearer is completely set up between UE2 208 and the eNode B 204, the initial entry procedure of UE2 208 to the network for D2D communication is completed in operation 232.

Figure 3:
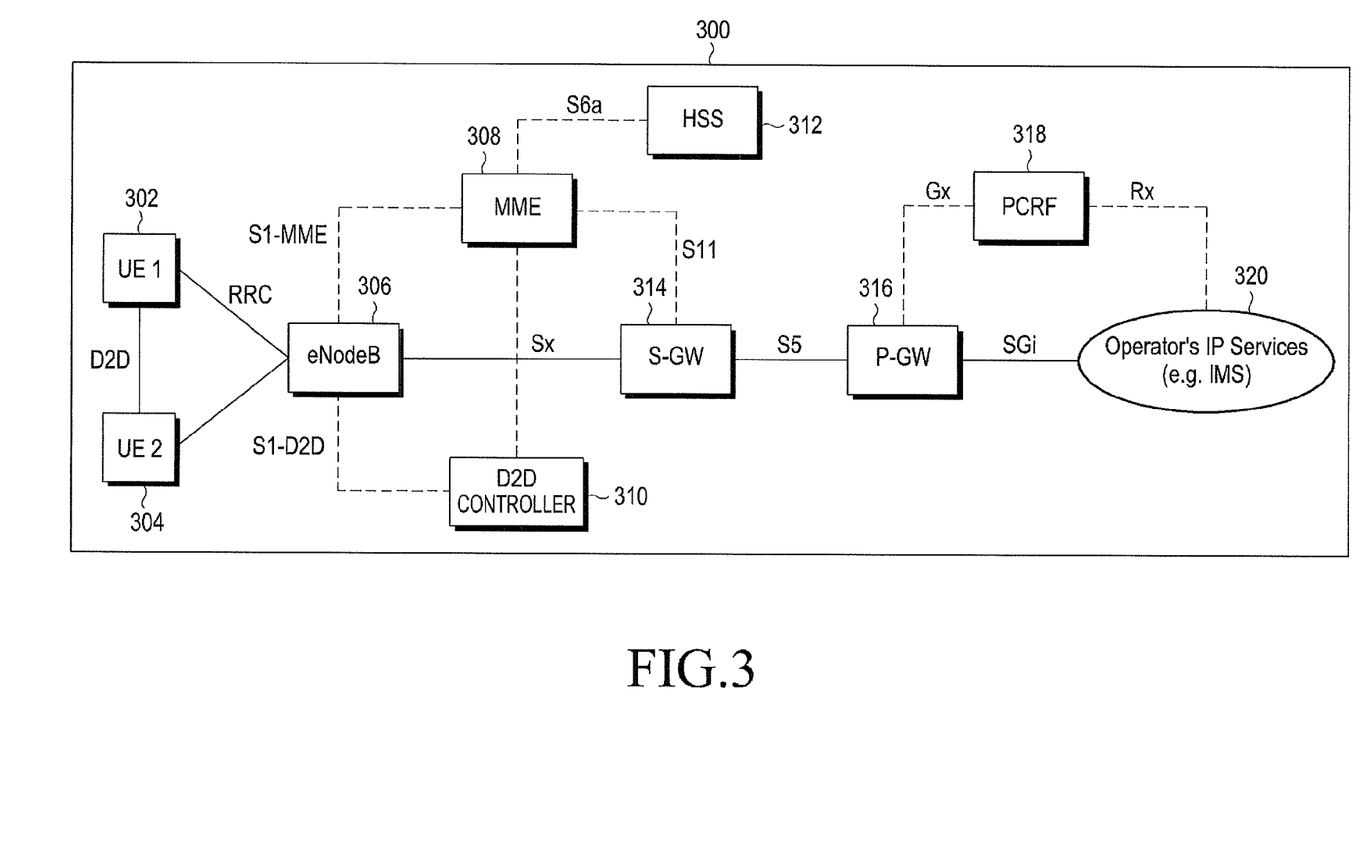
FIG. 3 illustrates a configuration of an LIE system in which initial entry for D2D communication is performed according to another embodiment of the present disclosure.

FIG. 3 illustrates a configuration of an LTE system in which initial entry for D2D communication is performed according to another embodiment of the present disclosure.

Referring to FIG. 3, an LTE system 300 according to the embodiment of the present disclosure includes a D2D controller 310 for supporting D2D communication between UEs having a D2D communication function. The D2D controller 310 may be configured separately from other existing components in the LTE system 300 or may be incorporated into an MME 308.

The D2D controller 310 is a logical entity which is, for example, connected to an eNode B 306 via an S1-D2D interface and to the MME 308 via an Sx interface. Interfaces between the D2D controller 310 and nearby devices may be changed according to the position of the D2D controller 310 in the LIE system 300. The S1-D2D interface is defined as a tunnel through which D2D communication information is transmitted between UEs that are to conduct D2D communication, for example, UE1 302 and UE2 304. The D2D communication information includes, for example, information about resources and a frequency allocated for D2D communication and an ID of a UE transmitting a D2D service request in the LTE system 300. The Sx interface is a tunnel through which D2D communication information is transmitted between the D2D controller 310 and the MME 308. The D2D communication information includes, for example, security and authentication information about a UE that is to conduct the D2D communication, mobility support information such as a mode change of the UE, and discovery support information about the UE.

It is assumed herein that UE2 304 supports D2D communication and is to initially access the LTE system 300, for D2D communication. UE2 304 within the service coverage of the LIE system 300 transmits a D2D service request to the eNode B 306 via an RRC interface. Then the eNode B 306 forwards the D2D service request to the D2D controller 310 via the S1-D2D interface. The D2D service request includes D2D communication information. The D2D controller 310 determines whether support of a higher-layer entity is needed based on the D2D communication information acquired from the D2D service request. If determining that support of a higher-layer entity is needed, the D2D controller 310 connects to the MME 308 via the Sx interface.

In an embodiment, a P-GW 316 connected to the MME 308 is connected to an S-GW 314 via an S5 interface and thus serves as an anchor to transmit data information directed to a UE from an IP network 320. A Policy and Charging Rule Function (PCRF) 318 measures the amount of data transmitted to the P-GW 316 and charges for the data amount according to an accounting policy. Accordingly, an S5 interface is allocated on a UE bearer basis. The accounting poly for D2D communication may vary with a service provider. The accounting policy may be managed in the PCRF 318 and charges may be determined through communication with the D2D controller 310. The eNode B 306 and the MME 308 support the mobility of UEs via an S1-MME interface. The MME 308 receives profile information and security information about a user of a UE from an HSS 312 via an S6a interface. The MME 308 may control transfer of data in a mobility situation such as handover, in connection to the S-GW 314 via an S11 interface. The S1-MME interface and the S11 interface are logical interfaces.

Figure 4:
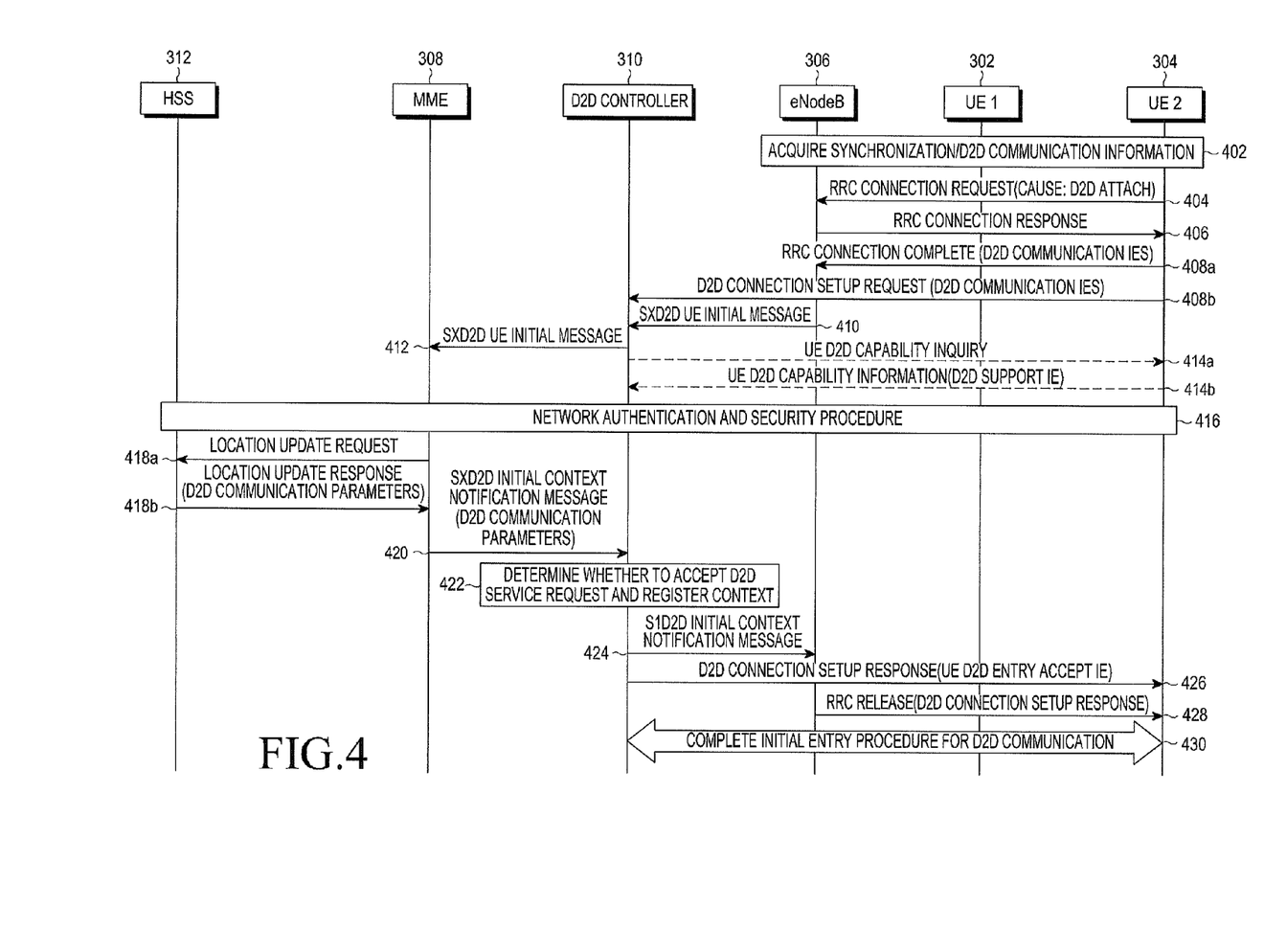
FIG. 4 illustrates a diagram of a signal flow for an initial entry procedure for D2D communication according to another embodiment of the present disclosure.

FIG. 4 illustrates a diagram of a signal flow for an initial entry procedure for D2D communication according to another embodiment of the present disclosure. It is assumed in the illustrated case of FIG. 4 that UE2 304 supports D2D communication and is to conduct D2D communication with UE1 302. For the convenience of description, the LTE system is configured as described with reference to FIG. 3. Therefore, the D2D controller 310 is configured independently from the MME 308 and performs a control operation for D2D communication between UEs supporting a D2D communication function. However, the D2D controller 310 may be incorporated into the MME 308 in another embodiment of the present disclosure.

Referring to FIG. 4, when UE2 304 is powered on, UE2 304 receives a synchronization signal from the eNode B 306 to acquire synchronization to a network and receives SI periodically from the eNode B 306 in operation 402. UE2 304 acquires D2D communication information of the LIE system to which the eNode B 306 belongs by receiving SI. The D2D communication information includes information indicating whether the LIE system supports D2D communication and information indication the position of resources for D2D communication. The D2D communication information may vary according to the type of a system.

In operation 404, UE2 304 transmits an RRC Connection Request message to the eNode B 306, for initial entry for D2D communication. The RRC Connection Request message is identical to an RRC Connection Request message used in the general LIE system except that a 'Cause' IE included in the RRC Connection Request message is set to D2D Attach. D2D Attach indicates D2D registration of UE2 304. Then the eNode B 306 allocates SRB 1 to UE2 304 and transmits an RRC Connection Response message to UE2 304 via SRB 1 in operation 406. Upon receipt of the RRC Connection Response message, UE2 304 transmits an RRC Connection Complete message indicating successful RRC connection setup to the eNode B 306 in operation 408a. Simultaneously, UE2 304 performs an initial entry procedure to the LTE communication system, for D2D communication by transmitting a D2D Connection Setup Request message proposed by the present disclosure to the D2D controller 310 through a NAS layer in operation 408b. D2D communication IEs, for example, as defined in (Table 4) may be inserted in the D2D Connection Setup Request message according to an embodiment of the present disclosure.

TABLE 4

| Information | Presence | Length | Description |
|---|---|---|---|
| IMSI(D2D Chip ID) | o | x | |
| D2D Connection setup cause | o | x | Depending D2D mode and scenario |

In (Table 4), IMSI indicates a unique ID of a UE supporting a D2D communication function, for example, UE2 304. D2D Connection setup cause may indicate whether the UE corresponding to the IMSI, that is, UE2 304 requests a D2D communication service. A cause of the D2D service request may be additionally configured depending on a D2D scenario or mode. Basically, it is assumed that when the UE supporting the communication function is powered on, the LTE system automatically supports an initial entry procedure of the UE for D2D communication in the embodiment of the present disclosure. Therefore, if the D2D controller 310 determines that the IMSI and the D2D Connection setup cause are included in the D2D Connection Setup Request message, the D2D controller 310 is aware that UE2 304 transmitting the D2D Connection Setup Request message supports the D2D communication function and requests the D2D communication service.

Since the eNode B 306 of the LTE system may not interpret the D2D Connection Setup Request message which is a NAS message as described before, UE2 304 inserts the D2D communication IEs as defined in (Table 4) as payload in the RRC Connection Complete message. Accordingly, the eNode B 306 initially establishes an S1-D2D bearer with the D2D controller 310 to transmit a NAS message to the D2D controller 310, as illustrated in FIG. 3. Then the eNode B 306 transmits an S1D2D UE Initial message including an ECGI and a TAI to the D2D controller 310 via the S1-D2D bearer in operation 410. The D2D controller 310 recognizes the D2D service request of UE2 304 by interpreting the S1D2D UE Initial message received via the S1-D2D bearer and the D2D Connection Setup Request message received through a NAS layer and thus recognizes the D2D service request of UE2 304 by confirming the presence of D2D parameters as illustrated in (Table 5), that is, an IMSI, an ECGI, and a TAI.

TABLE 5

| Information | Presence | Length | Description |
|---|---|---|---|
| IMSI(D2D Chip ID) | o | x | |
| ECGI | o | x | |
| TAI | o | x | |

In operation 412, the D2D controller 310 initially establishes an Sx bearer with the MME 308 by transmitting an SxD2D UE Initial message as illustrated in (Table 6) to the MME 308 in order to perfoim an authentication and security procedure for D2D communication with UE2 304. The SxD2D UE Initial message includes all of the D2D communication IEs included in the S1D2D UE Initial message. The SxD2D UE Initial message may further include an ID of the D2D controller 310.

TABLE 6

| Information | Presence | Length | Description |
|---|---|---|---|
| IMSI(D2D Chip ID) | o | x | |
| ECGI | o | x | |
| TAI | o | x | |
| D2D Controller ID | o | x | |

In operation 414a, the D2D controller 310 transmits a UE D2D capability inquiry to UE2 304 to check capabilities of UE2 304, on behalf of the eNode B 306. UE2 304 transmits UE D2D Capability Information including a D2D Support IE indicating that UE2 304 supports D2D communication to the eNode B 306 in operation 414b, according to the foregoing embodiment of the present disclosure.

In operation 416, the MME 308 initially performs a network authentication/security operation in response to the D2D service request of UE2 304. During the network authentication/security operation, the LTE system of the eNode B 306 and UE2 304 perform mutual authentication and thus UE2 304 generates a root key according to a network authentication and security procedure defined in the LTE system. Once network integrity is established by the network authentication/security operation, the MME 308 requests subscriber information about UE2 304 to the HSS 312 by transmitting a Location Update Request message in operation 418. The HSS 312 transmits a Location Update Response message in response to the Location Update Request message to the MME 308 in operation 418b. Because UE2 304 supports D2D communication, the Location Update Response message includes D2D communication parameters proposed according to an embodiment of the present disclosure as well as the subscriber information about UE2 304. The D2D communication parameters are identical to D2D communication parameters included in the Location Update Response message according to the foregoing embodiment of the present disclosure and thus will not be described herein in detail.

In operation 420, the MME 308 transmits the D2D communication parameters in an SxD2D Initial Context Notification message to the D2D controller 310.

The D2D controller 310 determines whether a target UE requested for the D2D communication exists near to UE2 304 based on the D2D communication parameters in operation 422. In the presence of at least one target UE for the D2D communication, the D2D controller 310 determines to accept the D2D service request of UE2 304, while in the absence of any target UE for the D2D communication, the D2D controller 310 determines to reject the D2D service request of UE2 304. Then the D2D controller 310 stores information indicating 'accept' or 'reject' regarding the D2D service request of UE2 304 according to the determination result. If the D2D service request of UE2 304 is acceptable, the D2D controller 310 stores the D2D communication parameters as a context of UE2 304 in operation 422.

In operation 424, the D2D controller 310 transmits an S1D2D Initial Context Notification message to the eNode B 306 to thereby notify the eNode B 306 of completion of network registration of UE2 304 for D2D communication. If the eNode B 306 and the D2D controller 310 together perform resource scheduling for the D2D communication of UE2 304 and discovery of a target UE for the D2D communication, the eNode B 306 uses the D2D communication parameters. In operation 426, the D2D controller 310 transmits a D2D Connection Setup Response message including an IE illustrated in (Table 7) to UE2 304, for example, by NAS signaling.

TABLE 7

| Information | Presence | Length | Description |
| --- | --- | --- | --- |
| UE D2D Entry Accept | o | 1 | 0: Reject<br>1: Accept |

In (Table 7), a UE D2D Entry Accept IE indicates whether UE2 304 is allowed to enter the network for D2D communication. For example, the UE D2D Entry Accept IE may be 1 bit.

In an embodiment, if the RRC connection for the D2D communication is not maintained after the network entry according to the characteristics of the system, the eNode B 306 transmits an RRC Release message having the D2D Connection Setup Response in payload to UE2 304 in operation 428.

If the UE D2D Entry Accept IE included in the D2D Connection Setup Response is set to 'accept', the initial network procedure of UE2 304 for D2D communication is completed.

Figure 5A:
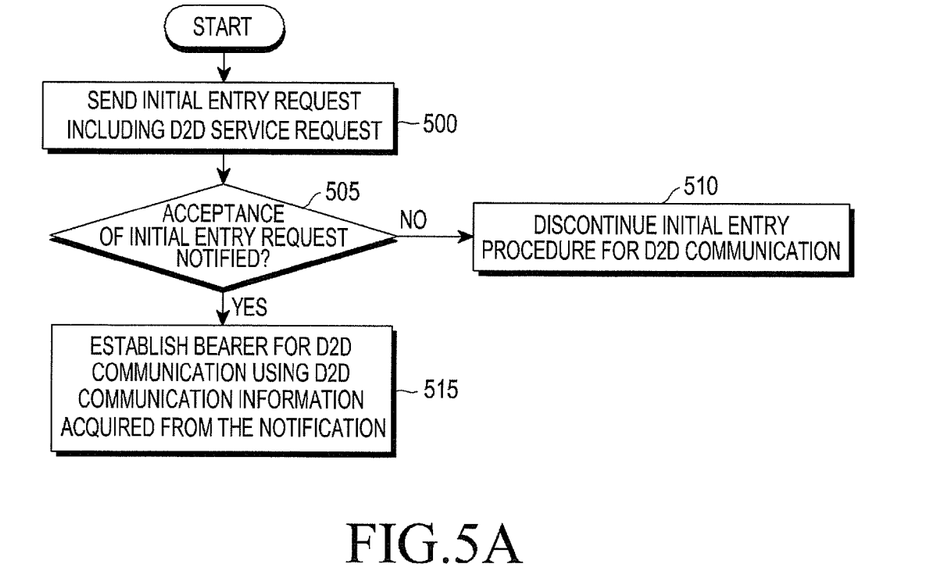
FIG. 5A illustrates a flowchart of an operation of a UE according to an embodiment of the present disclosure.

FIG. 5A illustrates a process of an operation of a UE according to an embodiment of the present disclosure.

Referring to FIG. 5A, the UE transmits an initial entry request including a D2D service request to an MME in operation 500. For example, it is assumed that the UE is located in an LTE system and is placed in RRC-connected state after synchronization to an eNode B and acquisition of SI. Like the Attach Request message in operation 216b of FIG. 2, the initial entry request includes a UE D2D Support IE as defined in (Table 2). The UE has transmitted the UE D2D Support IE to the eNode B during RRC connection setup.

In operation 505, the UE determines whether a notification indicating whether the initial entry request for D2D communication is accepted or rejected has been received. If the notification indicates rejection of the initial entry request for D2D communication, the UE discontinues the initial entry procedure for D2D communication in operation 510.

Alternatively, if the notification indicates acceptance of the initial entry request for D2D communication, the UE sets up a bearer for D2D communication based on D2D communication information acquired from the notification in operation 515. The notification indicating 'accept' regarding the initial entry request may be received in the Attach Accept message in operation 226 of FIG. 2. The Attach Accept message includes D2D communication information, that is, an encryption key for use in D2D communication as defined in (Table 3).

Figure 5B:
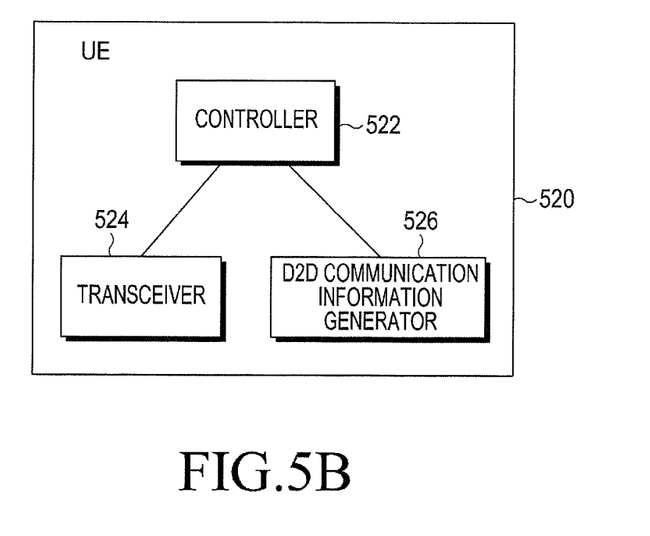
FIG. 5B illustrates a block diagram of a UE according to an embodiment of the present disclosure.

FIG. 5B illustrates a block diagram of a UE according to an embodiment of the present disclosure.

Referring to FIG. 5B, a UE 520 includes a controller 522, a transceiver 524, and a D2D communication information generator 526. The UE 520 is configured in correspondence with an embodiment of the present disclosure, by way of example. Thus one component may be divided into a plurality of sub-units or a plurality of components may be incorporated into a single unit in another embodiment of the present disclosure. Herein, it is assumed that the UE 520 intends to request D2D communication in the LIE system. Then the controller 522 controls the D2D communication information generator 526 to include D2D communication information in messages used for an initial entry procedure of the legacy LIE system. For example, the D2D communication information generator 526 sets IEs that indicate support of D2D communication in the UE 520 and request a D2D communication service in an Attach Request message under the control of the controller 522. The transceiver 524 transmits the Attach Request message to an MME under the control of the controller 522. The controller 522 may control the D2D communication information generator 526 to include the D2D service request in a message transmitted to an eNode B during RRC connection setup before transmitting the Attach Request message.

If confirming that the transceiver 524 has received a response to the Attach Request message, the controller 522 checks information indicating whether the D2D service request is accepted or rejected and D2D communication information in the response. If the response includes information indicating 'accept' regarding the D2D service request, the controller 522 performs a default bearer setup procedure for D2D communication with the eNode B based on the D2D communication information.

Figure 6A:
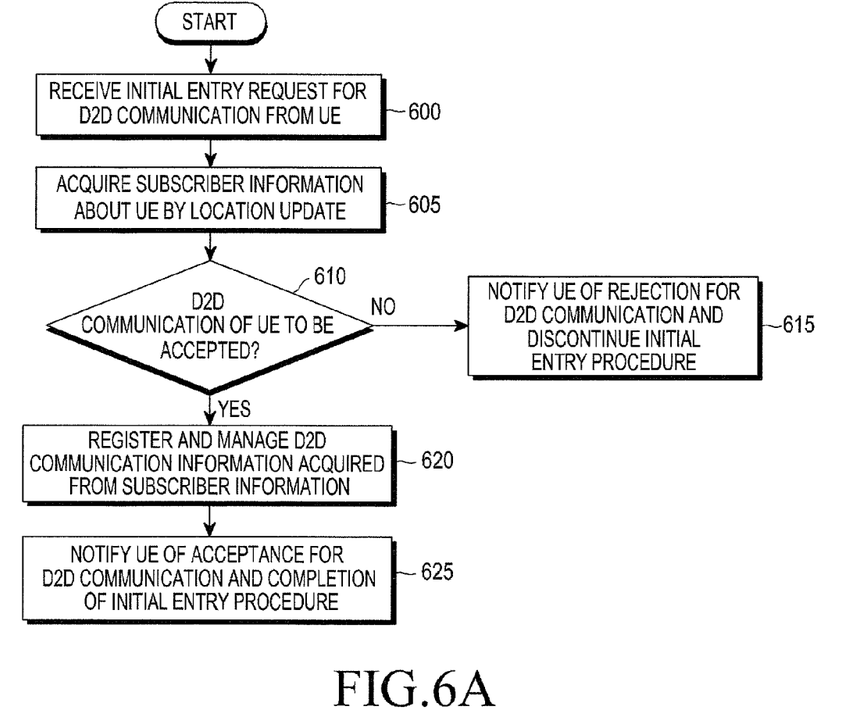
FIG. 6A illustrates a process of an operation of a D2D controller according to another embodiment of the present disclosure.

FIG. 6A illustrates a process of an operation of a D2D controller according to another embodiment of the present disclosure. The D2D controller may be configured independently of an MME in the LTE system illustrated in FIG. 3. In another embodiment of the present disclosure, the D2D controller may be incorporated into the MME.

Referring to FIG. 6A, the D2D controller receives an initial entry request including a D2D service request from a UE in operation 600. The initial entry request may be transmitted, for example, in a D2D Connection Setup Request message according to operation 408b of FIG. 4. The D2D service request may be included in the form of D2D communication IRs as defined in (Table 4).

In operation 605, the D2D controller acquires subscriber information about the UE by performing a location update procedure for the UE with an HSS through the MME. Since the UE supports a D2D communication function, the subscriber information includes D2D communication parameters. The D2D communication parameters include at least one of information about an APN to which the UE has subscribed for D2D communication, the ID of a P-GW to which the UE is connected, and a user class. In operation 610, the D2D controller determines whether to accept the D2D service request of the UE based on the subscriber information.

In the absence of a target UE for the D2D communication near to the UE, the D2D controller transmits information indicating rejection of the D2D service request to the UE and discontinues the initial entry procedure for D2D communication in operation 615.

Alternatively, in the presence of at least one target UE for D2D communication near to the UE, the D2D controller manages D2D communication of the UE by registering the D2D communication information for the UE in operation 620. In operation 625, the D2D controller notifies the UE that the D2D service request has been 'accepted' and the initial entry procedure for D2D communication has been completed.

Figure 6B:
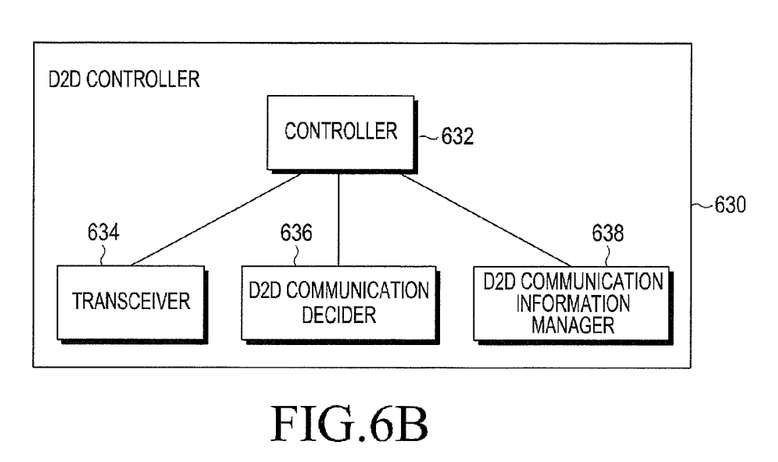
FIG. 6B illustrates a block diagram of a D2D controller according to another embodiment of the present disclosure.

FIG. 6B illustrates a block diagram of a D2D controller according to another embodiment of the present disclosure.

Referring to FIG. 6B, a D2D controller 630 includes, for example, a controller 632, a transceiver 634, a D2D communication decider 636, and a D2D communication information manager 638. The D2D controller 630 is configured in correspondence with an embodiment of the present disclosure, by way of example. Thus one component may be divided into a plurality of sub-units or a plurality of components may be incorporated into a single unit in another embodiment of the present disclosure.

The D2D controller 630 may be configured independently from an MME or may be incorporated into the MME in an LIE system.

Upon receipt of an initial entry request including a D2D service request from a UE at the transceiver 634, the controller 632 performs a capability query/response procedure with the UE and a location update procedure with an HSS through the MME, thus acquiring subscriber information about the UE and D2D communication parameters. The initial entry request may be transmitted, for example, in a D2D Connection Setup Request message according to operation 408b of FIG. 4. The D2D service request may be included in the form of D2D communication IEs as defined in (Table 4). The D2D communication parameters include at least one of an APN to which the UE has subscribed for D2D communication, the ID of a P-GW to which the UE is connected, and a user class.

Then the controller 632 controls the D2D communication decider 636 to determine whether to accept the D2D service request of the UE based on the subscriber information and the D2D communication parameters. In the absence of a target UE for the D2D communication near to the UE, the D2D communication decider 636 determines not to accept the D2D service request. Then the controller 632 discontinues the initial network procedure for D2D communication and controls the transceiver 634 to transmit information indicating rejection of the D2D service request to the UE.

Alternatively, in the presence of at least one target UE for D2D communication near to the UE, the D2D communication decider 636 determines to accept the D2D service request. Then the controller 632 controls the transceiver 634 to notify the UE that the D2D service request has been accepted and the initial entry procedure for D2D communication has been completed.

As described above, when D2D communication is conducted in an LTE communication system, an initial entry procedure for D2D communication may only be performed by modifying the structures of messages used in a conventional initial entry procedure to include D2D communication information and by additionally installing a D2D controller in the wireless communication system.

The proposed method and apparatus for performing initial entry for D2D communication in a wireless communication system may be implemented as computer-readable code in a computer-readable recording medium. The computer-readable recording medium may include any kind of recording device storing computer-readable data. Examples of the recording medium may include Read Only Memory (ROM), Random Access-Memory (RAM), optical disk, magnetic tape, floppy disk, hard disk, non-volatile memory, and the like, and may also include the medium that is implemented in the form of carrier waves (for example, transmission over the Internet). In addition, the computer-readable recording medium may be distributed over the computer systems connected over the network, and computer-readable codes may be stored and executed in a distributed manner.

As is apparent from the foregoing description, an initial entry procedure for D2D communication may only be performed by transmitting and receiving a service request for D2D communication, information indicating whether the service request is accepted, resource allocation information, and the like in existing messages defined for a conventional initial entry procedure.

Although the present disclosure has been described with an example embodiment, various changes and modifications may be suggested to one skilled in the art. It is intended that the present disclosure encompass such changes and modifications as fall within the scope of the appended claims.

What is claimed is:

1. A method for serving device-to-device (D2D) communication by a device in a wireless communication system, the method comprising:
   receiving, from a base station (BS) to be synchronized, system information comprising information related to the D2D communication;
   transmitting, to the BS, radio resource control (RRC) connection request message based on the system information;
   receiving, from the BS, an RRC connection response message including information on a signaling radio bearer, in response to the RRC connection request message;
   transmitting, to the BS, an RRC connection complete message comprising D2D communication support information, in response to the RRC connection response message;
   when the D2D communication is required, transmitting to a mobility management entity (MME) an attach request message comprising information indicating whether the device supports the D2D communication; and
   receiving, from the MME, an attach accept message comprising an accept notification of the D2D communication and an encryption key for the D2D communication.

2. The method of claim 1, further comprising:
   when an RRC reconfiguration request message is received from the BS, establishing a default bearer with the BS; and
   transmitting, to the BS, an RRC reconfiguration response message in response to the RRC reconfiguration request message.

3. The method of claim 1, wherein the information related to the D2D communication comprises information indicating whether the BS supports the D2D communication, and resource location information for the D2D communication.

4. The method of claim 1, wherein the D2D communication support information comprise an information element indicating whether the device supports the D2D communication or whether the device requests the D2D communication.

5. The method of claim 1, further comprising:
receiving, from the BS, a capability request message for the device; and
transmitting, to the BS, a capability response message comprising an information element indicating whether the device supports D2D communication.

6. A method for supporting device-to-device (D2D) communication, by a base station (TBS'), in a wireless communication system, the method comprising:
transmitting, to a device to be synchronized, system information comprising information related to the D2D communication;
receiving, from the device, radio resource control (RRC) connection request based on the system information;
transmitting, to the device, an RRC connection response including information on a signaling radio bearer, in response to the RRC connection request;
receiving, from the device, an RRC connection complete message comprising D2D communication support information, in response to the RRC connection response;
when the RRC connection complete message is received, establishing an initial bearer with a mobility management entity (MME); and
transmitting, to the MME an initial context information of the device,
wherein the information related to the D2D communication comprises information indicating whether the BS supports the D2D communication, and resource location information for the D2D communication.

7. The method of claim 6, further comprising:
receiving, from the MME, an initial context request message comprising accept notification of the D2D communication;
establishing a default bearer with the device after transmission of an RRC reconfiguration request message;
receiving, from the device, an RRC reconfiguration response message in response to the RRC reconfiguration request message; and
when the RRC reconfiguration response message is received, transmitting, to the MME, an initial context response message in response to the initial context request message.

8. The method of claim 6, wherein the D2D communication support information comprise an information element indicating whether the device supports the D2D communication or whether the device requests the D2D communication.

9. A device for serving device-to-device (D2D) communication in a wireless communication system, the device comprising:
a controller configured to determine that the D2D communication is required, and control a transceiver; and
the transceiver configured to:
receive, from a base station (BS) to be synchronized, system information comprising information related to the D2D communication,
transmit, to the BS, radio resource control (RRC) connection request message based on the system information,
receive, from the BS, an RRC connection response message including information on a signaling radio bearer, in response to the RRC connection request message,
transmit, to the BS, an RRC connection complete message comprising D2D communication support information, in response to the RRC connection response message,
when the D2D communication is required, and transmit, to a mobility management entity (MME), an attach request message comprising information indicating whether the device supports the D2D communication, and
receive, from the MME, an attach accept message comprising an accept notification of the D2D communication and an encryption key for the D2D communication.

10. The device of claim 9, further comprising:
when an RRC reconfiguration request message is received from the BS, the controller is configured to establish a default bearer with the BS; and
the transceiver is configured to transmit, to the BS, an RRC reconfiguration response message in response to the RRC reconfiguration request message.

11. The device of claim 9, wherein the information related to the D2D communication comprises information indicating whether the BS supports the D2D communication, and resource location information for the D2D communication.

12. The device of claim 9, wherein the D2D communication support information comprise an information element indicating whether the device supports the D2D communication or whether the device requests the D2D communication.

13. The device of claim 9, further comprising:
the transceiver is configured to receive, from the BS, a capability request message for the device, and transmit, to the BS, a capability response message comprising a information element indicating whether the device supports the D2D communication.

14. A base station (BS) for supporting device-to-device (D2D) communication in a wireless communication system, the BS comprising:
a controller configured to control a transceiver;
the transceiver configured to:
transmit, to a device to be synchronized, system information comprising information related to the D2D communication,
receive, from the device, radio resource control (RRC) connection request based on the system information,
transmit, to the device, an RRC connection response including information on a signaling radio bearer, in response to the RRC connection request,
receive, by the BS, an RRC connection complete message comprising D2D communication support information, in response to the RRC connection response,
when the RRC connection complete message is received, establish an initial bearer with a mobility management entity (MME), and
transmit, to the MME an initial context information of the device,
wherein the information related to the D2D communication comprises information indicating whether the BS supports the D2D communication, and resource location information for the D2D communication.

15. The BS of claim 14, further comprising:
the transceiver is configured to receive, from the MME, an initial context request message comprising accept notification of the D2D communication;
the controller is configured to establish a default bearer with the device after transmission of an RRC reconfiguration request message;
the transceiver is configured to receive, from the device, an RRC reconfiguration response message in response to the RRC reconfiguration request message; and
when the RRC reconfiguration response message is received, the transceiver is configured to transmit, to the MME, an initial context response message in response to the initial context request message.

16. The BS of claim 14, wherein the D2D communication support information comprise an information element indicating whether the device supports the D2D communication or whether the device requests the D2D communication.

* * * * *